United States Patent
Liu et al.

(10) Patent No.: US 10,662,504 B2
(45) Date of Patent: May 26, 2020

(54) METHOD FOR RECOVERING LITHIUM FROM LOW-CONTEXT EXTRACTION TAILWATER AND RECYCLING EXTRACTION TAILWATER

(71) Applicant: Hunan Jinyuan New Materials Co., Ltd., Yiyang (CN)

(72) Inventors: Xunbing Liu, Yiyang (CN); Jianjun Ouyang, Yiyang (CN); Xijuan Liu, Yiyang (CN)

(*) Notice: Subject to any disclaimer, the term of this patent is extended or adjusted under 35 U.S.C. 154(b) by 0 days.

(21) Appl. No.: 16/261,156

(22) Filed: Jan. 29, 2019

(65) Prior Publication Data

US 2019/0153563 A1     May 23, 2019

Related U.S. Application Data

(63) Continuation of application No. PCT/CN2017/103692, filed on Sep. 27, 2017.

(30) Foreign Application Priority Data

Oct. 31, 2016 (CN) .......................... 2016 1 0928469

(51) Int. Cl.
   *C22B 26/12* (2006.01)
   *C22B 3/26* (2006.01)
   (Continued)

(52) U.S. Cl.
   CPC .......... *C22B 26/12* (2013.01); *C01D 5/00* (2013.01); *C01D 5/02* (2013.01); *C01D 15/08* (2013.01);
   (Continued)

(58) Field of Classification Search
   CPC .................................................. C22B 26/12
   See application file for complete search history.

(56) References Cited

U.S. PATENT DOCUMENTS 8,641,992 B2   2/2014   Galli et al.
9,677,152 B2   6/2017   Asano et al.

FOREIGN PATENT DOCUMENTS

CN   102099296 A  *  6/2011 ............... C01D 3/06
CN   102163760 A     8/2011
   (Continued)

OTHER PUBLICATIONS

Internation Search Report of PCT/CN2017/103692, dated Jan. 10, 2018.

*Primary Examiner* — Melissa S Swain
(74) *Attorney, Agent, or Firm* — Erson IP (Nelson IP)

(57) ABSTRACT

A method for recovering lithium from low-content extraction tailwater and recycling extraction tailwater is provided. The disclosure is characterized that recovery of lithium from lithium-containing extraction tailwater is achieved by adding calcium to remove fluorine, carrying out evaporative crystallization and precipitating lithium salts. Recycle of extraction tailwater is achieved by adopting the following steps: in the lithium-containing extraction tailwater, adding calcium to remove fluorine, carrying out evaporative crystallization, recovering condensate water, precipitating a lithium salt and recycling mother liquor. According to the disclosure, lithium is recovered from low-content extraction tailwater via enrichment and sodium sulfate and distilled water therein are incidentally recovered, so that zero release of battery waste treatment wastewater is achieved.

9 Claims, 1 Drawing Sheet

(51) Int. Cl.
*C22B 3/44* (2006.01)
*C02F 1/58* (2006.01)
*H01M 10/54* (2006.01)
*C01D 15/08* (2006.01)
*C01D 5/02* (2006.01)
*H01M 10/052* (2010.01)
*C01F 11/22* (2006.01)
*C01D 5/00* (2006.01)
*C22B 3/22* (2006.01)

(52) U.S. Cl.
CPC ............... *C01F 11/22* (2013.01); *C02F 1/58* (2013.01); *C22B 3/0005* (2013.01); *C22B 3/22* (2013.01); *C22B 3/44* (2013.01); *H01M 10/052* (2013.01); *H01M 10/54* (2013.01); *Y02P 10/234* (2015.11)

(56) References Cited

FOREIGN PATENT DOCUMENTS

| | | | |
|---|---|---|---|
| CN | 104105803 A | * | 10/2014 |
| WO | 2014042136 A1 | | 3/2014 |

* cited by examiner

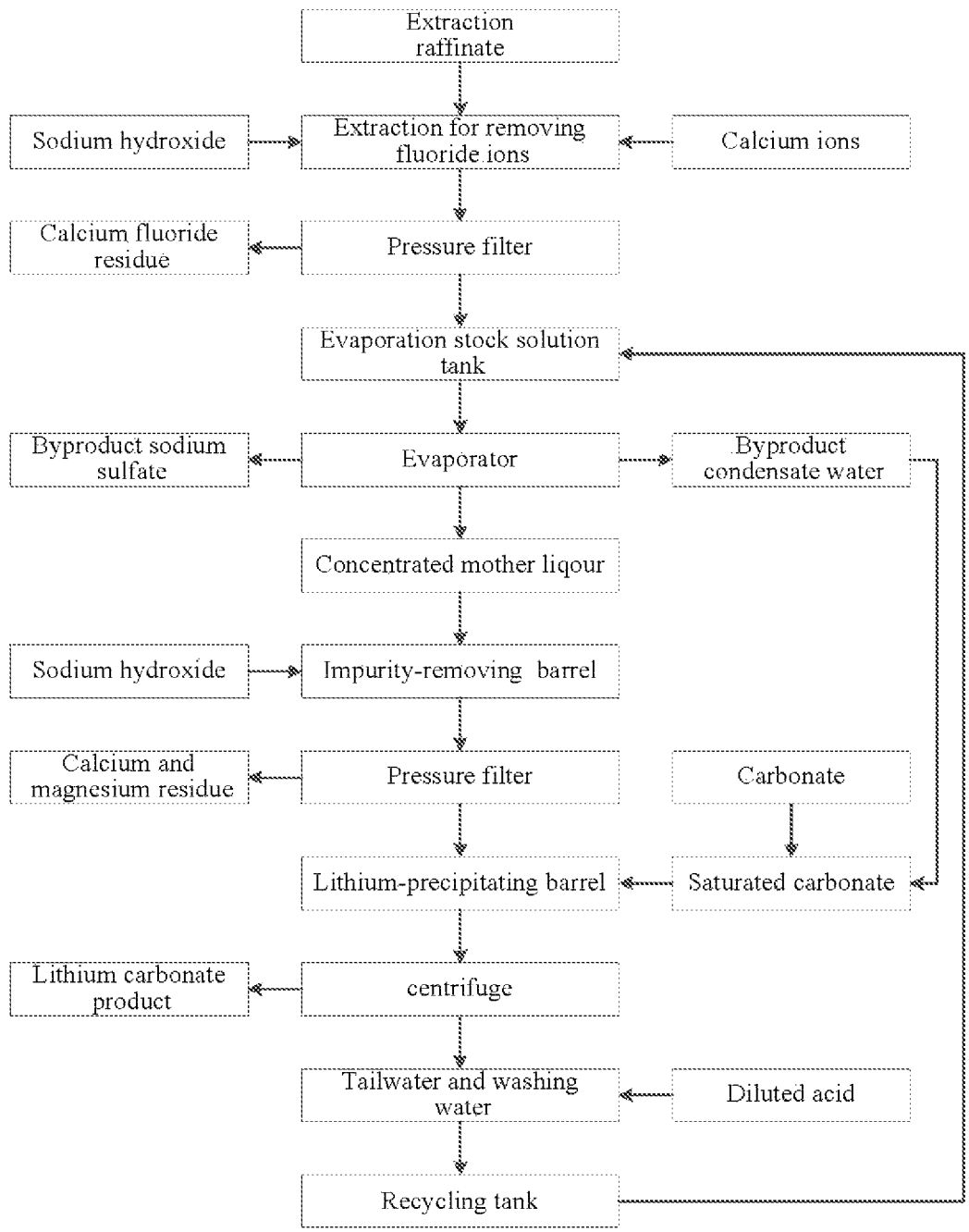

METHOD FOR RECOVERING LITHIUM FROM LOW-CONTEXT EXTRACTION TAILWATER AND RECYCLING EXTRACTION TAILWATER

CROSS-REFERENCE TO RELATED APPLICATIONS

This application is a continuation of International Patent Application No. PCT/CN2017/103692 with a filing date of Sep. 27, 2017, designating the United States, now pending, and further claims priority to Chinese Patent Application No. 201610928469.0 with a filing date of Oct. 31, 2016. The content of the aforementioned applications, including any intervening amendments thereto, are incorporated herein by reference.

TECHNICAL FIELD

The disclosure relates to a method for extracting lithium from tailwater an recycling industrial wastewater.

BACKGROUND OF THE PRESENT INVENTION

In cyclic economy, most of lithium elements in battery wastes are generally present in extraction raffinate via extraction of cobalt, nickel and magnesium. Due to low content, lithium elements are typically 1.5-2.5 g/L, in content, difficult to enrich and high in recovery cost, so they are not recovered in the past; treated tailwater is discharged to cause environmental pollution and resource waste. There are no reports of relevant techniques about how to extract lithium from lithium-containing extraction tailwater and achieve zero release of battery waste processing wastewater at present.

SUMMARY OF PRESENT INVENTION

The objective of the disclosure is to disclose a method for recovering lithium from low-content extraction tailwater via enrichment and incidentally recovering sodium sulfate and distilled water therein so as to achieve zero release of battery waste treatment wastewater.

The technical solution of the method for recovery of lithium from low-content extraction tailwater of the disclosure is as follows: the method is characterized that recovery of lithium from low-content extraction tailwater is achieved by adding calcium to remove fluorine, carrying out evaporative crystallization and precipitating a lithium salt.

The technical solution of the method for recycling extraction tailwater of the disclosure is as follows: the method is characterized by comprising the following steps: in the lithium-containing extraction tailwater, adding calcium to remove fluorine, carrying out evaporative crystallization, recovering condensate water, precipitating a lithium salt, and recycling mother liquor.

After the evaporative crystallization, an impurity-removing process is set.

Further, the adding calcium to remove fluorine is realized by adding sodium hydroxide to extraction raffinate with extraction of cobalt, nickel and manganese to regulate a pH value to 8-13, preferably, 9-12 and 10-11, adding a calcium-containing material so that a F/Ca ion mole is 1/1-5, preferably, 1/2-4 and 1/3, reacting for 0.5-4 h, preferably, 1-3.5 h, 1.5-3 h and 2-2.5 h, filtering and washing, wherein filtrate is evaporation stock solution.

Further, the calcium-containing material can be quick lime and calcium oxide.

Further, the evaporative crystallization is realized by concentrating the stock solution to 1/(4-16), preferably, 1/(5-15), 1/(6-14), 1/(7-13), 1/(8-12), 1/(9-11) and 1/10, by adopting an evaporation, concentration and crystallization manner, so that sodium sulfate in the stock solution is crystallized and the content of lithium in concentrated solution reaches 5-30 g/L, 6-25 g/L, 7-20 g/L, 8-18 g/L, 9-16 g/L, 10-14 g/L and 11-12 g/L, and simultaneously recovering condensate water.

Further, the removing impurities is realized by regulating the pH value of concentrated stock solution with alkali to 11-14, preferably, 12-14 and 13, to remove impurities such as calcium and magnesium therein.

Further, the precipitating a lithium, salt is realized by heating with condensate water to prepare saturated carbonate solution, adding the solution to heated concentrated mother liquor so that a lithium ion is precipitated as lithium carbonate for recovery.

More further, the speed of adding the saturated carbonate solution into the heated concentrated mother liquor is 0.1-1.0 m$^3$, preferably, 0.2-0.9 m$^3$, 0.3-0.8 m$^3$ 0.4-0.7 m$^3$ and 0.5-0.6 m$^3$.

Further, the recycling mother liquor: regulating the pH value of lithium-precipitating tail liquor and lithium carbonate washing liquor with acid to 2.5-6, preferably, 3.0-5.5, 3.5-5.0 and 4.0-4.5, to remove carbonate radicals therein, and then returning the residual solution back to an evaporation stock solution tank.

BENEFICIAL EFFECTS OF THE DISCLOSURE

Due to adoption of the above technical solution, the disclosure has the beneficial effects that recovery of lithium from low-content extraction tailwater can be achieved via enrichment, and sodium sulfate and distilled water therein are incidentally recovered, so that zero release of battery waste treatment wastewater is achieved.

DESCRIPTION OF THE DRAWINGS

FIG. 1 is a flowchart of a process according to the disclosure.

PREFERRED EMBODIMENT OF THE DISCLOSURE

Provided is a method for recovering lithium from low-content extraction tailwater and recycling the extraction tailwater, comprising the following steps:

1) addition of calcium to remove fluorine adding sodium hydroxide into extraction, raffinate with extraction of cobalt, nickel and manganese to regulate pH to 10, adding quick lime so that, a F/Ca ion mole is 1/2, reacting for 1.5 h, filtering and washing.

2) evaporative crystallization concentrating stock solution to 1/15 using double-effect evaporation so that sodium sulfate in the stock solution is oversaturated to generate heat crystals and byproduct anhydrous sodium sulfate, and simultaneously recovering condensate water, wherein, the content of lithium in the concentrated solution reaches 25 g/L.

3) removal of impurities regulating the pH value of concentrated mother liquor to 13 with alkali, washing and, filtering to remove impurities such as calcium and magnesium therein.

4) precipitation of lithium carbonate heating to 100° C. with the condensate water generated by evaporative crystallization, adding sodium carbonate to prepare saturated sodium carbonate solution, adding the saturated solution into the heated concentrated mother liquor at a speed of 0.5 m$^3$ in a mass ratio of lithium to sodium carbonate in the saturated sodium carbonate solution of 1:9 in net weight, reacting for 3 h, filtering with a centrifuge, and washing to obtain a lithium carbonate product.

5) recycle of lithium-precipitating mother liquor regulating the pH value of filter tailwater obtained after precipitation of lithium and lithium carbonate washing liquor to 2.5 with 1+1 sulfuric acid to remove excess carbonate radicals and then returning back to an evaporation stock solution tank.

DETAILED DESCRIPTION OF PREFERRED EMBODIMENTS

The disclosure will be further described in combination with embodiments.

A method for recovering lithium from low-content extraction tailwater: recovery of lithium from the lithium-containing extraction tailwater is achieved by adding calcium to remove fluorine, carrying out evaporative crystallization and precipitating lithium salts.

A method for recycling lithium-containing extraction tailwater: calcium is added into the lithium-containing extraction tailwater to remove fluorine, evaporative crystallization is carried out, condensate water is recovered, a lithium salt is precipitated, and mother liquor, is recycled.

After evaporative crystallization, impurities can be removed with alkali.

The adding calcium to remove fluorine is realized by sodium'hydroxide is added to extraction raffinate with extraction of cobalt, nickel and manganese to regulate a pH value to 8-13, a calcium-containing material is added so that a F/Ca ion mole is 1/1-5, and filtering and washing are carried out, wherein filtrate is evaporation stock solution.

The evaporative crystallization is realized by the stock solution is concentrated to 1/4-16 by adopting an evaporation, concentration and crystallization manner so that sodium sulfate in the stock solution is crystallized and the content of lithium in concentrated solution reaches 5-30 g/L, and condensate water is simultaneously recovered.

The removing impurities is realized by regulating the pH value of concentrated stock solution is regulated to 11-14 with alkali to remove impurities such as calcium and magnesium therein.

The precipitating a lithium salt is realized by heating is carried out with condensate water to prepare saturated carbonate solution, the solution is added to heated concentrated mother liquor so that a lithium ion is precipitated as lithium carbonate or prepared into other lithium salts for recovery.

The speed of adding the saturated carbonate solution into the heated concentrated mother liquor is 0.1-1.0 m$^3$.

The recycling lithium-precipitating mother liquor: the pH value of lithium-precipitating tail liquor and lithium carbonate washing liquor is regulated to 2.5-6 with acid to remove carbonate radicals therein, and then residual solution is returned back to an evaporation stock solution tank.

EXAMPLE 1

A Method for Recovering Lithium from Low-Content Extraction Tailwater and Recycling the Extraction Tailwater Comprises the Following Steps 1) adding calcium to remove fluorine adding sodium hydroxide to extraction raffinate with extraction of cobalt, nickel and manganese to regulate a pH value to 9, adding quick lime so that a F/Ca ion mole is 1/1, reacting for 0.5 h, filtering and washing.

2) carrying out evaporative crystallization concentrating the stock solution to 1/10 adopting double-effect evaporation, so that, sodium sulfate in the stock solution is oversaturated to generate heat crystals and byproduct sodium sulfate, and simultaneously recovering condensate water, wherein the content of lithium in concentrated solution reaches 15 g/L.

3) removing impurities regulating the pH value of concentrated stock solution to 12 with alkali, filtering and washing to remove impurities such as calcium and magnesium therein.

4) precipitating lithium carbonate heating with condensate water generated by evaporative crystallization to 100° C., adding sodium carbonate to prepare saturated carbonate solution, adding the saturated solution to heated concentrated mother liquor at a speed of 0.3 m$^3$ in a mass ratio of lithium to sodium carbonate in the saturated sodium carbonate solution of 1:10 in net weight, reacting for 2 h, filtering with a centrifuge and washing to obtain lithium carbonate product.

5) recycling lithium-precipitating mother liquor regulating the pH value of filter tailwater obtained by lithium is precipitated and lithium carbonate washing liquor to 5 with 1+1 sulfuric acid to remove excess carbonate radicals, and then returning the residual solution back to an evaporation stock solution tank.

EXAMPLE 2

A Method for Recovering Lithium from Low-Content Extraction Tailwater and Recycling the Extraction Tailwater Comprises the Following Steps 1) adding calcium to remove fluorine adding sodium hydroxide to extraction raffinate with extraction of cobalt, nickel and manganese to regulate a pH value to 9, adding calcium chloride so that a F/Ca ion mole is 1/1.5, reacting for 1 h, filtering and washing.

2) carrying out evaporative crystallization concentrating the stock solution to 1/12 adopting three-effect evaporation, so that sodium sulfate in the stock solution is oversaturated to generate, heat crystals and byproduct sodium sulfate, and simultaneously recovering condensate water, wherein the content of lithium in concentrated solution reaches 20 g/L.

3) removing impurities regulating the pH value of concentrated stock solution to 13 with alkali, filtering and washing to remove impurities such as, calcium and magnesium therein.

4) precipitating lithium carbonate heating with condensate water generated by evaporative crystallization to 100° C., adding sodium carbonate to prepare saturated carbonate solution, adding the saturated solution to heated concentrated mother liquor at a speed of 0.2 m³ in a mass ratio of lithium to sodium carbonate in the saturated sodium carbonate solution of 1:9 in net weight, reacting for 3 h, filtering with a centrifuge and washing to obtain lithium carbonate product.

5) recycling lithium-precipitating mother liquor regulating the pH value of filter tailwater obtained after precipitation of lithium and lithium carbonate washing liquor to 3 with 1+1 sulfuric acid to remove excess carbonate radicals, and then returning the residual solution back to an evaporation stock solution tank.

EXAMPLE 3

A Method for Recovering Lithium from Low-Content Extraction, Tailwater and Recycling the Extraction Tailwater Comprises the Following Steps 1) adding calcium to remove fluorine adding sodium hydroxide to extraction raffinate with extraction of cobalt, nickel and manganese to regulate a pH value to 10, adding quick lime so that a F/Ca ion mole is 1/2, reacting for 1.5 h, filtering and washing.

2) carrying out evaporative crystallization concentrating the stock solution to 1/15 adopting double-effect evaporation, so that sodium sulfate in the stock solution is oversaturated to generate heat crystals and byproduct sodium sulfate, and simultaneously recovering condensate water, wherein, the content of lithium in concentrated solution reaches 25 g/L.

3) removing impurities regulating the pH value of concentrated stock solution to 13 with alkali, filtering and washing to remove impurities such as, calcium and magnesium therein.

4) precipitating lithium, carbonate heating with condensate water generated by evaporative crystallization to 100°C., adding sodium carbonate to prepare saturated carbonate, solution, adding the saturated solution to heated concentrated mother liquor at a speed of 0.5 m³ in a mass ratio of lithium to sodium carbonate in the saturated sodium carbonate solution of 1:9 in net weight, reacting for 3 h, filtering with a centrifuge and washing to obtain lithium carbonate product.

5) recycling lithium-precipitating mother liquor regulating the pH value of filter tailwater obtained after precipitation of lithium and lithium carbonate washing liquor to 2.5 with 1+1 sulfuric acid to remove excess carbonate radicals, and then returning the residual solution back to an evaporation stock solution tank.

EXAMPLE 4

A Method for Recovering Lithium from Low-Content Extraction Tailwater and Recycling the Extraction Tailwater Comprises the Following Steps 1) adding calcium to remove fluorine adding sodium hydroxide to extraction raffinate with extraction of cobalt, nickel and manganese to regulate a pH value to 9, adding quick lime so that a F/Ca ion mole is 1/1.3, reacting for 1.0 h, filtering and washing.

2) carrying out evaporative crystallization concentrating the stock solution to 1/9 adopting MVP evaporation so that sodium sulfate in the stock solution is oversaturated to generate heat crystals and byproduct sodium sulfate, and simultaneously recovering condensate water, wherein the content of lithium in concentrated solution reaches 12 g/L.

3) removing impurities regulating the pH value of concentrated stock solution to 13 with alkali, filtering and washing to remove impurities, such as calcium and magnesium therein.

4) precipitating lithium carbonate heating with condensate water generated by evaporative crystallization to 100° C., adding sodium carbonate to prepare saturated carbonate solution, adding the saturated solution to heated concentrated mother liquor at a speed of 0.5 m³ in a mass ratio of lithium to sodium carbonate in the saturated sodium carbonate solution of 1:8.2 in net weight, reacting for 1 h, filtering with a centrifuge and washing to obtain lithium carbonate product.

5) recycling lithium-precipitating mother liquor regulating the pH value of filter tailwater obtained after precipitation of lithium and lithium carbonate washing liquor to 4 with 1+1 sulfuric acid to remove excess carbonate radicals and then returning the residual solution back to an evaporation stock solution tank.

Detection Results of Various Processes in Examples of the Disclosure

| Items | Chemical components | | | | |
| --- | --- | --- | --- | --- | --- |
| | Li | Fe | Ca | Mg | Na |
| Extraction raffinate (g/L) | 1.25 | 0.001 | 0.001 | 0.001 | 23.54 |
| Evaporation stock solution (g/L) | 1.25 | 0.001 | 0.68 | 0.01 | 23.44 |
| Fluorineremoval residue (%) | 0.001 | 2.35 | 22.54 | 5.12 | 0.51 |
| Concentrated mother liquor (g/L) | 15.36 | 0.015 | 1.58 | 0.56 | 250.25 |
| Byproduct sodium sulfate(%) | 0.015 | 0.01 | 0.62 | 0.12 | 29.35 |
| Impurity-removing solution (g/L) | 15.28 | 0.001 | 0.001 | 0.001 | 250.25 |
| Product lithium carbonate (%) | 17.54 | 0.001 | 0.0021 | 0.001 | 2.11 |
| Lithium-precipitating tailwater (%) | 1.76 | 0.001 | 0.001 | 0.001 | 127.11 |

Embodiments of the disclosure are not limited to the above examples, each technical key within the scope of parameters in the technical solution of the disclosure and near the scope of parameters and technical features reasoned and expanded and combined by those skilled in the art according to the technical solution of the disclosure are all included within the scope listed by embodiments of the disclosure.

INDUSTRIAL APPLICABILITY

In the disclosure, after an experiment research in a lab is completed, a pilot pant test is carried out. Compared with the prior art, significant technical effects are gained.

| Technical Effects Comparison between the Disclosure and Prior Art | | |
|---|---|---|
| Comparative index | Effects of the existing technique | Technical effects of the disclosure |
| Recovery of lithium from low-lithium-content extraction tailwater | No, extremely high cost | Yes, low cost |
| Treatment of tailwater | Discharge | Total utilization, zero release |
| Sodium sulfate | No recovery | recovery |
| Quality of lithium carbonate | / | Industrial grade |

We claim:

1. A method for recovering lithium from low-content extraction tailwater, comprising:
　adding calcium into a first extraction tailwater which is lithium-containing to remove fluorine to obtain a second extraction tailwater;
　carrying out evaporative crystallization on the second extraction tailwater to obtain a third extraction tailwater;
　precipitating lithium salts from the third extraction tailwater to obtain a fourth extraction tailwater which is non-lithium containing; and
　recycling the fourth extraction tailwater.

2. The method for recovering lithium from low-content extraction tailwater according to claim 1, comprising the following steps:
　adding calcium to remove fluorine in the first extraction tailwater which is lithium-containing to obtain the second extraction tailwater;
　carrying out evaporative crystallization on the second extraction tailwater to obtain the third extraction tailwater;
　recovering condensate water;
　precipitating the lithium salts from the third extraction tailwater to obtain the fourth extraction tailwater; and
　recycling the fourth extraction tailwater.

3. The method for recovering lithium from low-content extraction tailwater-according to claim 1, wherein, after evaporative crystallization, removing impurities from the third extraction tailwater.

4. The method for recovering lithium from low-content extraction tailwater according to claim 1, wherein, the step of adding calcium to remove fluorine comprises the following steps:
　adding sodium hydroxide to the first extraction tailwater in which cobalt, nickel and manganese is extracted to regulate a pH value to 8-13;
　adding a calcium-containing material so that a F/Ca ion mole is 1/(1-5);
　reacting for 0.5-4 h;
　filtering and washing, wherein filtrate is evaporation stock solution.

5. The method for recovering lithium from low-content extraction tailwater according to claim 1, wherein, the evaporative crystallization is realized by the following steps:
　concentrating the second extraction tailwater-to 1/(4-16) by evaporating the second extraction tailwater and crystallizing sodium sulfate in the second extraction tailwater so that a content of lithium in third extraction tailwater reaches 5-30 g/L, and
　recovering the condensate water.

6. The method for recovering lithium from low-content extraction tailwater according to claim 3, wherein, the step of removing impurities comprises the following steps:
　regulating the pH value of the third extraction tailwater to 11-14 with alkali to remove impurities including calcium and magnesium.

7. The method for recovering lithium from low-content extraction tailwater according to claim 1, wherein, the step of precipitating the lithium salts comprises the following steps:
　preparing a saturated carbonate solution with the condensate water;
　heating the third extraction tailwater;
　adding the saturated carbonate solution to the third extraction tailwater which is heated so that a lithium ion is precipitated as lithium carbonate for recovery.

8. The method for recovering lithium from low-content extraction tailwater according to claim 2, wherein, the step of recycling the fourth extraction tailwater comprises the following steps:
　regulating the pH value of the fourth extraction tailwater to 2.5-6 to remove carbonate radicals therein, and
　returning the fourth extraction tailwater back to an evaporation stock solution tank.

9. The method for recovering lithium from low-content extraction tailwater-according to claim 8, wherein, the pH value of the fourth extraction tailwater is regulated to 3.0-5.5 with acid.

* * * * *